Aug. 15, 1950     T. P. GIBLIN     2,518,538
AUTOMOBILE ACCESSORY
Filed Jan. 13, 1947
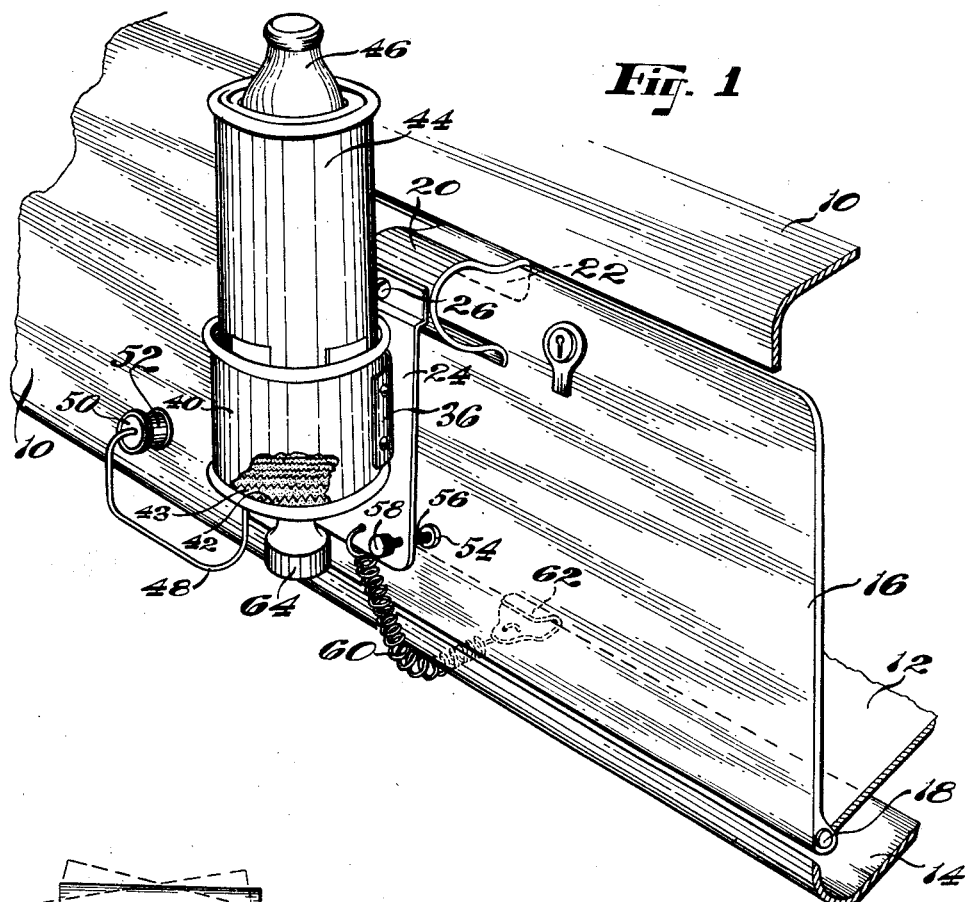
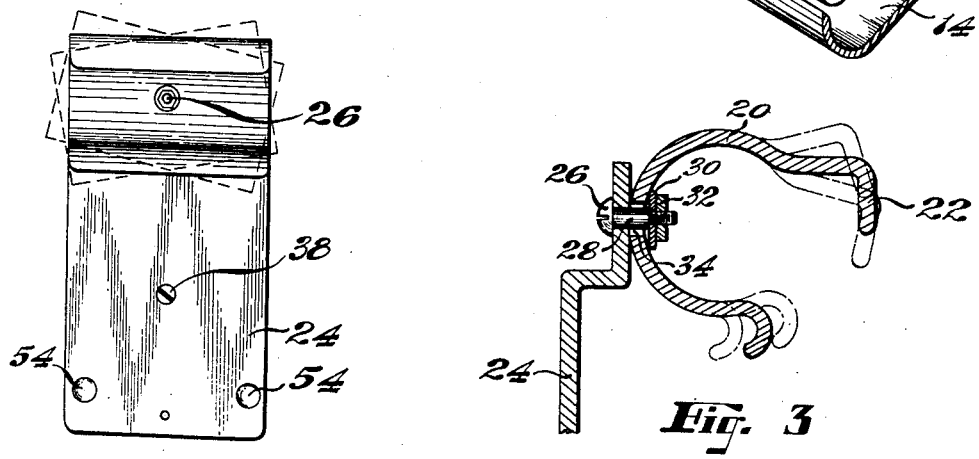
INVENTOR.
THOMAS P. GIBLIN
BY Kenway & Witter
Attys.

Patented Aug. 15, 1950

2,518,538

UNITED STATES PATENT OFFICE 2,518,538

AUTOMOBILE ACCESSORY

Thomas P. Giblin, Pawtucket, R. I.

Application January 13, 1947, Serial No. 721,838

5 Claims. (Cl. 219—19)

The present invention comprises a novel bracket and door combination, including a bracket by means of which a bottle warmer or other accessory may be detachably mounted quickly and without the use of tools and as quickly detached and removed from the hinged door of the glove compartment found in the instrument board of all automobiles.

The problem solved by this invention is the provision of a detachable bracket which may be universally applied to all passenger carrying automobiles. The one element common to all of them as determined by extensive research is a hinged door for a glove compartment or locker in the instrument board and, while the design of doors varies in respect to both outline and contour, I have succeeded in providing a bracket which will accommodate itself to all such variations.

Going more into detail I have found that some doors are curved in outline while others are rectangular. I have also found that some doors are flat in contour and others have a pronounced convex curvature. The bracket of my invention is designed for association with doors of any of these types and for adjustment so that the accessory may be maintained in vertical position upon any of them.

In one aspect my invention comprises a new and improved bottle warmer arranged to be supported by means of my novel detachable bracket in convenient position in front of the person at the righ hand of the driver. The bracket comprises a flanged upper member arranged to hook over the upper edge of the door, a vertical body portion to which the accessory is connected and a tension spring carrying a clip or finger arranged to engage either the lower edge of the door or the instrument board itself and thus to maintain the bracket and accessory in upright position without rattling or looseness. If the accessory is an electrically heated bottle warmer or frankfort cooker, it may be conveniently plugged into the adjacent cigar lighter socket and the installation thus completed.

The flanged upper portion of the bracket is articulated and connected to the main body portion thereof for rocking adjustment in two planes at right angles to each other for the accommodation of various shapes of the door to which it is to be attached. The body portion of the bracket is preferably provided with an adjustable stop or stops which may be so set as to hold the body portion in vertical position when it is brought yieldingly against the outer surface of the door.

These and other features of my invention will be best understood and appreciated from the following description of a preferred embodiment thereof, selected for purposes of illustration and shown in the accompanying drawings, in which:

Fig. 1 is a view in perspective showing a bottle warmer attached to the door of a glove compartment, Fig. 2 is a view in elevation of the bracket members, and Fig. 3 is a view in vertical cross section through the upper portion of the bracket members.

In Fig. 1 the entire unit is shown assembled upon the door of the glove compartment of an automobile. There is shown the usual instrument board or cowl 10 of light gauge metal or plastic material. One portion of the instrument panel 10 is cut away to afford access to a glove compartment or box-like cupboard of which the bottom 12 is indicated in Fig. 1. The glove compartment is closed by the usual metal door 16 hinged at the bottom about a horizontally disposed hinge pin 18. The lower margin of the instrument board 10 is curved forwardly to form a horizontal flange 14 which extends for the complete length of the instrument panel 10 and underlies the bottom 12 of the glove compartment.

The accessory of my invention includes a cylindrical clip 20, disposed transversely and provided at its upper branch with a depending flange 22, arranged to engage the upper edge of the door 16. Cooperating with the clip 20 is a vertically disposed flat rectangular plate 24 stamped out of sheet metal and bent to form a shouldered portion along its upper margin. A machine screw 26 passes through a hole in the shouldered portion of the plate 24 and through a corresponding hole formed in the cylindrical clip 20. The hole in the plate 24 is just large enough to accommodate the screw 26 and a surrounding spacer sleeve 28. The hole in the clip 20 is considerably larger in diameter than the outside diameter of the spacer sleeve 28 and is indicated at 34. A washer 30 surrounds the screw 26 and butts against the inner face of the clip 20 and the end of the spacer 28, while a nut 32 serves to hold the several pieces in proper assembly. It will be evident that the plate 24 and the clip 20 may be shifted relative to one another since the hole 34 in the clip 20 will permit movement of the screw 26 and the plate 24.

Secured to the plate 24 by a screw 38 is an arcuate strip 36 providing support for a cylindrical cup or socket 40 in the bottom of which is mounted an electric heating unit comprising several reaches of resistance wire 42 partially embedded in a disc of refractory insulating material 43. An elongated cylindrical member 44 of light metal is suitably dimensioned to accommodate the body portion of a conventional nursing bottle 46, the top of the member 44 being open to permit the neck of the bottle to extend upwardly through it. A cable 48 contains the lead wires for the electric heating unit and preferably terminates in a plug 50 suitably arranged to be received in the socket 52 of the sort generally provided for a cigar lighter. When the plug 50 is inserted in the socket 52 the circuit to the heating unit is closed.

Carried on the end of a pair of screws 56 threaded through the lower margin of the plate 24 is a pair of rubber buttons 54 which rest against the outer surface of the door 16. The screws 56 are provided with knurled heads 58 by means of which the plate 24 may be shifted in and out. The screws 56 comprise stop members which are adjustable in order to make it possible to set the plate 24 and socket 40 in vertical position regardless of the contour of the door 16. A tension spring 60 is caught at one end into the lower central portion of the plate 24 and carries at its other end a curved clip 62 arranged to engage the inner edge of the bottom flange 14 of the instrument panel 10. The clips 20 and 62, together with the spring 60 hold the plate 24 firmly in position. The screw 26 provides a pivotal connection between the plate 24 and the clip 20 and thereby permits adjustment of the plate so that it may be set in vertical position regardless of the contour of the top of the door 16. In other words, the plate 24 may be adjusted in either of two planes in order to arrive at a vertical position and so accommodate the unit to doors of various outlines and contours. After the accessory has been mounted and adjusted to proper position, the container 44 may be pulled out of the socket 40, a bottle 46 placed upright in the socket 40; the container 44 is then replaced in the socket 40. The diameter of the container 44 is such that it is held in frictional engagement against the wall of the socket 42. Consequently the accessory may be used while the automobile is in motion and the bottle 46 will not be thrown out of the socket 40 when the automobile proceeds over rough ground.

A knob 64 is secured to the bottom of the socket 40 and provides convenient means for carrying the accessory when it is not mounted in position.

Having thus described my invention what I claim as new and desire to secure by Letters Patent of the United States is:

1. An accessory constructed and arranged to be detachably secured to a door hinged to swing about its lower edge in the instrument board of an automobile, and including in its structure a bracket having an elongated body portion carrying an electric heating unit, a flanged clip for connecting the upper end of the said body portion to the door and being angularly adjustable for that purpose, adjustable stops on the body portion and adapted to engage said door, spring means for causing said stops to locate the body portion of the bracket in substantially vertical position, and flexible connections whereby a heating unit may be plugged into the cigar lighter socket of the instrument board.

2. An accessory comprising a bracket having an elongated vertically disposed body portion carrying a receptacle, a clip pivotally attached to the upper end of the body portion and having a flange shaped to fit over the upper edge of a hinged door in the instrument board of an automobile, adjustable stops threaded into said body portion, and a tension spring connected to the lower end of said body portion and adapted to hold the stops in engagement with the face of the door thereby locating the bracket as a whole in substantially vertical position.

3. An accessory for automobile glove compartment doors, comprising a bracket including in its structure a plate, a clip pivotally mounted on said plate and curved to engage the upper edge of the glove compartment door, a substantially cylindrical socket secured to said plate, electric heating apparatus mounted in said socket, a spring connected to said plate, a finger secured to said spring and curved back upon itself, and adjustable stop members arranged on said plate and adapted to engage the door.

4. An automobile accessory comprising a bracket including in its structure a plate, a flanged clip pivotally connected to the upper edge of said plate, the clip being of substantially the same width as the plate, an elongated tension spring connected to the plate and adapted to hold it in vertical position, a second hooked clip secured to the spring and adapted to connect it to a fixed part of the automobile, a socket secured to said plate, and an electric heating unit mounted in said socket.

5. An automobile accessory comprising a bracket including in its structure a vertically disposed plate, a clip pivotally secured to the upper edge of said plate and adapted to hold it in vertical position, an elongated tension spring secured to the lower end of the plate for holding it in said position, a second hook-shaped clip carried by said spring and adapted to hook the spring to a fixed part of the automobile, a cylindrical socket secured to said plate, an electric heating unit mounted in said socket, and a pair of stop members threaded through the lower margin of said plate for limiting the movement of the plate under the tension of the spring.

THOMAS P. GIBLIN.

REFERENCES CITED

The following references are of record in the file of this patent:

UNITED STATES PATENTS

| Number | Name | Date |
|---|---|---|
| 1,604,972 | Clarke | Nov. 2, 1926 |
| 2,079,611 | Harvey | May 11, 1937 |